3,495,994
TOASTED DEHYDRATED POTATO PROCESS AND COMPOSITION

Eugene V. Kwiat, New Brighton, and David W. Andreas, Minneapolis, Minn., assignors to The Pillsbury Company, Minneapolis, Minn., a corporation of Delaware
No Drawing. Filed Dec. 2, 1966, Ser. No. 598,614
Int. Cl. A23b 7/03; A23l 1/12
U.S. Cl. 99—207          18 Claims

ABSTRACT OF THE DISCLOSURE

Dehydrated potatoes suitable for whipped potato recipes are prepared by dehydrating a potato mash containing toasted potato particles. Potato flakes or granulates prepared by the dehydration of such mash are characterized as possessing a matrix of dehydrated potato solids throughout which are uniformly distributed the toasted potato particles. The resultant product exhibits improved resistance to flavor changes, improved texture and tolerance to whipping. The toasted potato particles impart to the resultant whipped product a baked potato flavor.

---

This invention relates to dehydrated potatoes and the method for preparing the same. More particularly, the present invention relates to dehydrated, mashed potatoes containing dehydrated, toasted potatoes and the method of preparing the same.

In conventional methods, dehydrated potato products are prepared by mashing cooked potatoes and adding thereto surface active agents and drying the resultant product to provide a dehydrated potato product such as potato flakes. Surface active agents are added for the purposes of aiding processing, improving texture and enhancing the reconstitution properties of the resultant product. Two of the most significant problems encountered in palatable dehydrated, mashed potatoes relate to the properties of taste and texture which characterize the end product and the capability of the process to use a product which improves the flavor and texture of mashed potatoes produced directly from cooked potatoes. A substantial effort has been expended to improve these properties and as a result of this effort, dried, mashed potatoes have come into widespread use.

In an attempt to provide the desired dehydrated properties, the art has placed considerable emphasis upon adding surface active agents to the mashed potato product prior to the drying thereof. However, substantial difficulties are encountered due to inherent properties of potatoes grown under dissimilar climatic and soil conditions as well as differences arising from various potato species. Adequate amounts of surface active agents for a given potato run may prove inadequate on subsequent runs when potatoes having somewhat different inherent properties are employed. Consequently, maintaining the desired uniformity in respect to flavor and texture during the processing and conditions thereof has been difficult to achieve.

It is an object of the present invention to provide a dehydrated potato product which upon rehydration with an aqueous liquid and whipping provides a product having improved eating and taste characteristics.

Another object of the invention is to provide dehydrated potato products having improved texture when said potato product is rehydrated and whipped by the ultimate consumer.

It is still another object of the invention to provide a dehydrated, cooked product which upon reconstitution provides a baked, flavored potato product.

An additional object of the invention is to provide a potato product which has greater tolerance to whipping when ultimately used by the consumer.

A further object of the invention is to provide a method of preparing dehydrated potato products having improved processing properties.

According to the present invention, there is provided an edible, dehydrated potato product comprising a dehydrated potato solid, said dehydrated solid containing untoasted, dehydrated potato solids and at least a portion of toasted, dehydrated potatoes homogenously dispersed within said dehydrated potato solid.

The edible, dehydrated potato products provided herein are characterized by having an improved texture when the product is reconstituted and whipped by the ultimate consumer. Improved tolerance to whipping by the ultimate consumer is also provided by the disclosed product without concomitant pasty texture. In addition to the aforementioned benefits, dehydrated potatoes containing toasted potatoes provide a dehydrated potato product capable of being stored over prolonged periods of time with very slight change in flavor. Notwithstanding the darkened color of the toasted, dehydrated potato, it has been found that potato products provided herein possess substantially the same whiteness as the untoasted, dehydrated potato product. Consequently, when the present potato products are reconstituted and whipped, the resultant product whiteness is not adversely effected thereby. Since the toasted potato is uniformly distributed throughout and contained within a matrix of untoasted, dehydrated potato solids, product uniformity is maintained during shipping (e.g., nonsegregation thereof).

Based upon the total dry weight of toasted potatoes and untoasted, mashed potatoes contained in the dehydrated potato product, at least 5 weight percent toasted potato will provide an improved texture. To impart a baked potato flavor to the ultimate reconstituted and whipped product at least about 2 weight percent toasted dry potato solids is provided in the present dehydrated potato product. Reconstituted and whipped products having a baked potato flavor advantageously are provided when the total dry potato solids of the dehydrated potato product contains from about 5 to about 30 weight percent toasted potatoes. The preferred range of toasted potatoes for imparting baked potato flavor and proper texture is about 5 to about 15 weight percent.

Dehydrated, toasted white potatoes in contradistinction to untoasted, dehydrated white potatoes possess a characteristic color ranging from tan to dark brown. Such toasted potatoes are obtained from heat treatment of white, fleshed potatoes at elevated temperatures. For a particular level of texture, baked flavor, taste, etc., the prerequisite amount of toasted potatoes depends largely upon the degree of toasting imparted to the toasted potato product. Toasted potatoes ranging from a light to dark (e.g., heavy) toast may be employed. Consequently, to achieve an equivalent baked flavor taste and/or texture imparted by a heavily toasted potato in the instant products, a significantly greater amount of lightly toasted potatoes is necessary.

The degree of toasting imparted to a dehydrated product may be determined by a differential colorimeter whereby comparative reflective readings between an untoasted, dehydrated potato and the toasted, dehydrated potato thereof are ascertained. A suitable differential colorimeter for determining the degree of toasting is a "Colormaster Differential Colorimeter, Model IV," Ser. No. 129 manufactured by Manufacturer Engineering & Equipment Corporation of Hatboro, Pa., having a reference standard rotating assembly with a green setting of 87.97, a red setting of 87.82 and a blue setting of 87.68.

Exemplary comparative readings for a toasted, dehydrated potato product are as follows:

|  | L | a | b |
|---|---|---|---|
| Light toast | 87 | +1.5 | +15 |
| Dark toast | 70 | +10 | +30 | whereas the untoasted, dehydrated potato product containing 6 weight per cent moisture provided respective readings of L, a and b of 89.51, −2.4 and 17.8. Thus, the light toasted product provided an L reading about 2.5 less than the untoasted potato product and the dark toast reduced the L value by about 20. The preferred degree of toasting for the toasted potato product as employed herein provided an L reading from 75 to 85 (i.e., a reduced value of at least 4 to about 15), an a value of +2.5 to +7 and a and b value from +18 to +22.

Due to inherent characteristics of potatoes, the reflective readings for the untoasted, dehydrated potato products thereof will differ somewhat. Thus, the aforementioned readings are significant in respect to the relative change in readings resulting from the toasting of the dehydrated potato product.

Other analytical methods and apparatus may be employed as a means of distinguishing toasted from untoasted dehydrated potatoes. Employing such other analytical methods or apparatus, similar values relative to those described values herein may be obtained.

Similarly comparative reflective readings between toasted and untoasted potatoes which contain conventional dehydrated potato additives such as emulsifiers (e.g., glyceryl monostearate) will not adversely effect the relative values achieved in respect to the degree of toasting imparted thereto.

The manner of providing the toasted potato product is not critical. However, it is essential to provide the untoasted potato product in a form which will permit the toasting thereof. Toasting may be conducted in an oven under atmospheric conditions or under a vacuum. The efficacy of the resultant product in respect to texture is comparable under either method.

Suitable toasted potato products may be prepared by employing conventional potato flake producing drum driers. In drum drying, previously cooked and mashed potato products are dried as a thin layer. However, unlike conventional methods, the drum drying operation is allowed to continue for a longer time interval and preferably at a higher temperature to provide the brown color development therein. Thereafter, the potato layer is scraped from the drum in the form of a toasted potato flake.

Another method of providing a toasted potato product adaptable herein is to toast uncooked, dehydrated potato cubes. In such a method, previously peeled potatoes are blanched in the conventional manner. The peeled, blanched potatoes are then cut into relatively small cubes (e.g., ⅜" by ⅜" by ¼") and subsequently dried to about 5 percent moisture level at a temperature generally ranging from about 100° F. to about 180° F. The resultant dried potatoes are then toasted in a suitable oven at a temperature generally ranging from about 300° F. to about 350° F. for a period of time sufficient to provide substantial toasting throughout the entire cube (e.g., 8 minutes). Toasting of the aforementioned cubes is completed upon the attainment of a cube surface temperature ranging from about 240° F. to 250° F. Excessive charring of the toasted product should be avoided (e.g., 260° F. cube surface temperature will provide an undesirable, charred, hard, brittle product). Excessive charring adversely effects both the flavor and texture characteristics thereof. In order to prevent grittiness and nonuniform texture, it is preferred that at least 98 percent of the toasted product employed herein be less than 420 microns, 75 percent less than 300 microns with a major portion less than 200 microns.

The dehydrated potato products of the present invention are prepared by toasting white fleshed potatoes (e.g., potatoes which in nature contain less than about 500 international units of vitamin A per pound), forming a potato mash by mixing toasted potato with untoasted potato in an aqueous medium to uniformly disperse said toasted potato therein and drying the resulting potato mash to provide a dehydrated potato product containing less than 10 percent moisture.

It has been unexpectedly discovered that by uniformly distributing the toasted potatoes along with the untoasted, cooked potato solids in an aqueous medium in the potato mash, processing and product uniformity is greatly enhanced thereby. By employing the toasted potato in the mash, subsequent dehydration thereof is facilitated (e.g., drum sticking during drying is greatly reduced).

By providing a potato mash comprising water, toasted potato product and untoasted potatoes, the toasted potato product is substantially and uniformly distributed throughout the mash. By preparing a potato mash and subsequently dehydrating the mash, the resultant dehydrated potato exhibits an improved resistance to flavor changes which generally occur when the product is stored over prolonged periods of time.

Since the toasted potato particles are firmly bonded in a matrix of untoasted dehydrated solid, product uniformity during packaging and shipping is maintained.

Suitable untoasted potatoes include peeled raw potatoes, cooked mashed potatoes, blanched mashed and unmashed potatoes, dehydrated mashed potatoes such as potato flakes and granules, mixtures thereof and the like.

In general, depending upon the properties of the starting materials, a suitable mash comprises about 15 to about 55 percent potato solids and about 45 to about 85 percent water. Advantageously, the mash consists essentially of from about 20 to about 30 percent by weight potato solids and from about 70 to about 80 weight percent water. It should be apparent herein that the term "water" as used herein includes aqueous medium equivalents such as milk which is primarily comprised of water.

The potato mash may be prepared by various methods. An appropriate amount of toasted potato product can, for example, be added to unmashed, untoasted potatoes such as raw peeled potatoes and/or blanched and/or cooked potatoes as well as the untoasted mash thereof. The mashed product of such whole potatoes generally contain sufficient water to provide uniform distribution of the toasted product therein. When untoasted, dehydrated potatoes such as potato flakes and granules are employed, sufficient water should be added to insure uniform distribution of the toasted potato therein and bonding or adherence of the toasted portion to the untoasted portion (e.g., an untoasted, dehydrated potato matrix).

The potato products disclosed herein are adaptable to a wide range of dehydrated potato products and may be prepared by various methods. For example, dried potato flakes containing the toasted potatoes may be prepared by the methods disclosed in United States Patents Nos. 2,759,832; 2,787,553 and 2,780,552 by James Corning, Jr., et al. Additional dehydrated potato products in which the invention is applicable include the porous, dehydrated potato products and the method for preparing the same such as disclosed in United States Patents Nos. 3,031,312; 3,031,313 and 3,093,488. In general, such dehydrated potatoes contain less than 10 weight percent moisture (generally ranges between and 10 weight percent) with most conventional methods providing a dehydrated potato product having from about 4 to about 8 weight percent moisture (weight percents based upon the total weight of the dehydrated potato product).

Various other additives conveniently added to dehydrated potato products such as flavoring agents, preservatives, whitening agents, antioxidants, salt, milk solids and surface active agents such as glyceryl monostearate, glyceryl monopalmitate, etc. are adaptable herein.

Illustrative varieties of potatoes adaptable herein include California Russet Burbank, Idaho Russet, Pontiac, Cobbler, Kennebec, Snowflake and other potatoes.

Alternatively to the potato product comprising a matrix of untoasted, dehydrated potatoes containing toasted, dehydrated potato particles uniformly distributed throughout the matrix (hereinbefore described), a mashed potato product providing an improved texture can be prepared from water-dispersible, toasted and untoasted potato particles. Suitable toasted and untoasted particles include potato flakes and granules.

Preparation of the edible, mashed potato product for ultimate consumption is accomplished by heating an aqueous medium to a temperature of at least 150° F. (generally in the range of 180° F. to 212° F.), admixing the heated aqueous medium with the dehydrated, toasted and untoasted particles to disperse the particles in the aqueous medium, allowing the dehydrated, toasted and untoasted potato particles to absorb water without agitation and whipping the particles containing absorbed water to provide a mashed potato product. The amount of aqueous medium necessary to provide the mashed potato product generally ranges from about 4 to about 6 parts by weight of potato solids and preferably about 5 parts by weight per part by weight potato solids. Conventional methods of providing mashed potato products from dehydrated potato solids such as adding cold milk to boiling water may be employed.

A more limited whipped potato mash provided by the present invention and utilized by the ultimate consumer is characterized by a mash comprising one part by weight reconstituted potato solids and from about 4 to about 6 parts by weight water, said reconstituted potato solids consisting essentially of reconstituted, untoasted, dehydrated potato particles and reconstituted, toasted potato particles in an amount ranging from about 5 to about 15 weight percent of the total untoasted potato particles dry weight, said toasted particles being further characterized as being toasted for a period of time sufficient to impart a reduction in the reflectance L value ranging from less than 10 percent to about 20 percent.

Unless otherwise disclosed, the moisture and dry potato solid weights are based upon the total weight of the dry potato product including all components therein and the weight of the toasted potatoes is based upon the amount of dry potato solids.

The following examples are illustrative of the invention.

EXAMPLE I (A) Preparation of the toasted potato product

Field run potatoes (Kennebecs and Pontiacs) were lye peeled in a conventional manner, sliced into 3/8" thick slices and rinsed to remove free starch. One hundred pounds of the sliced potatoes were then sliced into cubes of about 3/8" by 3/8" by 1/4", blanched 10 minutes in 180° F. anti-browning solution, and placed in an air dryer provided with a heated air flow maintained at 140° F. and dried therein to a moisture content of 5 percent. The dried cubes were then placed into a rotary tumble-type roaster and toasted at a temperature of 340° F. for 8 minutes. Surface temperature (as measured by a thermocouple) of the product upon completion of the roasting was 245° F.

The toasted potato cubes were ground to provide a pulverized, toasted product having the following characteristics:

99.2% less than 420 microns
73.6% less than 297 microns
53.6% less than 210 microns Reflective readings obtained via the hereinbefore described "Colormaster Differential Colorimeter, Model IV" for toasted potatoes are as follows:

L value _____ 80
a value _____ +5
b value _____ +20

(B) Preparation of dehydrated potato flakes containing toasted, dehydrated potatoes Field run potatoes (Kennebecs and Pontiacs) were lye peeled in a conventional manner, sliced into 1/2" thick slices and rinsed to remove the free starch. In conventional cooking equipment, potatoes were cooked at a temperature of 170° F. for about 30 minutes and then steam cooked for an additional 30 minutes. The cooked potatoes were then transferred to a conventional potato ricer, mashed and then conducted through a screw conveyor 20 feet long and 6 inches in diameter. Ten parts by weight toasted potato product from the above (A) per 90 parts by weight dry untoasted potato solid was metered at a uniform rate into the screw conveyor. Sufficient glyceryl monostearate to provide 0.3 percent by weight in the dehydrated product was also introduced into the screw conveyor. The conveyed potato product (i.e., the mash) had a 20 percent by weight solids content. Dehydration of the potatoes was accomplished by a typical commercial, hollow, single-drum dryer with a roller diameter of 5 feet and length of 16 feet which was provided with a doctor blade and 4 feed rollers positioned parallel to the axis of a hollow dryer roller at a clearance of 0.50 inch. The hollow dryer roller surface temperature was maintained at 330° F. with a 5 to 8 second contact time. The resultant dried product had a thickness of 0.009 inch and a moisture content of 6 weight percent. Uniform distribution of the toasted potato product and mashed, cooked potatoes was accomplished by means of a screw conveyor and mastication of the mashed product on the drum dryer.

(C) Reconstitution and whipping of the resultant product

Several portions of the dehydrated products thus prepared were reconstituted and whipped. One and one-quarter cups water, 1/2 teaspoon salt and 2 tablespoons butter were placed in a saucepan and heated to boiling, after which the heating was discontinued and 1/3 cup milk was added. Seventy grams of dehydrated potato product flakes were then added and stirred gently. The potato flakes after becoming soft and moist (30 seconds after addition) were whipped with a standard household fork. The reconstituted and whipped potato products containing the combination of toasted and untoasted potatoes provided a stiff but yet fluffy whipped potato product without pastiness and heaviness. The whipped product had an improved appearance and texture and a flavor very similar to that of baked potato. Whiteness of the product was not substantially altered by the addition of the toasted potato. It was also observed during the processing of the dehydrated product that the addition of the toasted potato flakes enhanced the drum drying thereof in that there was less tendency of the product to stick to the drum dryer. Storage tests at 72° F. and 100° F. indicated that the product was stable against flavor degradation even after 100 days of storage. Similar tests on potato flakes without the toasted potato therein indicated flavor degradation.

EXAMPLE II (A) Preparation of the toasted potato product

Dehydrated potato flakes (0.75 pound) containing about 7 weight percent moisture were toasted in a Hobart mixer equipped with a 3 quart bowl, a rheostatically controlled electric heating mantle, two thermocouples, one of which was adapted to ascertain the surface temperature of the flakes being toasted and the other adapted to ascertain the heating mantle temperature. The potato flakes were mixed at a low speed (No. 1) while maintaining the heating mantle at a temperature from about 350° F. to about 415° F. After one hour, the flake surfaces had achieved a temperature of 245° F.; the toasting operation was discontinued. The flakes were removed from the mixer and allowed to cool. Employing the hereinafter described "Model IV Colormaster Differential Colorimeter" reflective readings were as follows.

Toasted flakes:
    L value _____ +78.65
    a value _____ +3.9
    b value _____ +40.3

Untoasted flakes:
    L value _____ +89.51
    a value _____ −2.4
    b value _____ +18.7

(B) Preparation of the dehydrated potato flakes containing toasted, dehydrated potatoes Potato flakes containing toasted potato were prepared employing the toasted flakes in accordance with the method and amounts of Example IB.

Processing characteristics and properties of the resultant product similar to those observed in Example I were obtained, however, toasting imparted a somewhat different taste in that the flakes had a taste somewhat similar to a dried potato chip.

EXAMPLE III

Texture improvement imparted to mashed potato products containing toasted potatoes was ascertained by means of a shear press. Dehydrated potato solids, amounts thereof and shear press readings derived from the mashed potato product at the specified temperatures are tabulated in Table I.

TABLE I

| Run No. | Toasted Potato (grams) | Untoasted Potato Flakes (grams) | Shear Press Readings (pounds) | | |
|---|---|---|---|---|---|
| | | | 155° F. | 145° F. | 135° F. |
| 1 | | ¹ 66 | 65 | 58.5 | 53.5 |
| 2 | ² 6.6 | ² 59.4 | 48 | 49 | 44 |
| 3 | ³ 6.6 | ³ 59.4 | 58 | 61 | 50 |
| 4 | ⁴ 6.6 | ⁴ 59.4 | 45 | 47 | 49 |

¹ Dehydrated, untoasted potato flakes employed in Example IIA containing 0.3 percent by weight glyceryl monostearate.
² Dehydrated potato product preapred in accordance with Example IB.
³ Physical admixture of toasted potato from Example IA and the untoasted potato flakes of Example IIA.
⁴ Physical admixture of toasted potato flakes and untoasted potato flakes from Example IIA.

The aforementioned, dehydrated potato products were reconstituted and whipped in accordance with the manner of preparation set forth in Example IC. Shear press readings were obtained by means of an Allo Kramer Shear Press (Model S2HE) including the Allo Kramer Shear Press, recorder, indicator and a 2,500 pound proving ring dynamometer. A 0.064 inch orifice cell and 150 gram samples of the whipped products were employed. The electronic recorder was set at 10 percent of its full scale. Shear press readings are taken from the recorded curves in respect to the maximum pounds of force necessary to force the samples through the cell orifice at an extrusion time interval of 17 seconds. From Table I the high shear press value for Run 1 indicates a more pasty, heavy-textured product than that of Runs 2 to 4. Runs 2 and 4 shows a substantial reduction in force necessary to extrude the mashed product. Although Run 3 provided an improved texture over that of Run 1, a comparison between Run 2 and Run 3 depicts the improvement obtained by employing a dehydrated potato solid consisting essentially of a matrix of untoasted, dehydrated potatoes with dehydrated, toasted potato particles uniformly distributed throughout the matrix. The physical admixture of Run 3 depicts somewhat different results from Run 2 in that the toasted potato product was provided in a form that provided greater water dispersibility and absorbability than the toasted, powdered cubes of Run 3.

What is claimed is:

1. An edible, dehydrated solid potato particulate product having a moisture content of less than 10 percent by weight and adapted for reconstitution with water to form a mashed potato product, said dehydrated potato solid particulate product comprising potato particles characterized as consisting essentially of a solid matrix of untoasted, dehydrated potatoes containing toasted, dehydrated potato particles uniformly distributed throughout said matrix of said potato particles with the amount of toasted potato particles based upon the total dry weight of potato solids of said particulate product ranging from about 2 to about 30 weight percent.

2. The product according to claim 1 wherein the toasted particles portion has a comparative reflectance L value ranging from less than 2.0 to less than about 20 from that of the untoasted, dehydrated potato.

3. The product according to claim 2 wherein the toasted potato portion has a comparative reflectance L value to that of the untoasted, dehydrated potato contained therein ranging from less than 4 to less than about 15.

4. The product according to claim 3 wherein the amount of toasted potato particles ranges from about 5 to about 15 weight percent and at least 75 percent of the toasted potato particles are less than 300 microns.

5. The product according to claim 4 wherein the product is a potato flake having a moisture content ranging from about 4 to 8 percent by weight.

6. A method of providing a dehydrated potato product comprised of a matrix of untoasted, dehydrated potatoes with dehydrated, toasted potato particles homogeneously distributed throughout said matrix which comprises:

(a) toasting dehydrated white, fleshed potatoes containing less than about 500 international units of naturally occurring vitamin A per pound;

(b) admixing and uniformly distributing the toasted, dehydrated potato particles in a potato mash of cooked, untoasted potatoes with the dry weight ratio of toasted particles to potato mash solids uniformly distributed therein ranging from about 1:50 to about 3:7; and, (c) dehydrating the admixture of toasted and untoasted potatoes to provide a dehydrated potato product comprised of a solid matrix of untoasted dehydrated potatoes containing toasted dehydrated particles uniformly distributed throughout said matrix and thereby providing a dehydrated potato product having less than 10 percent by weight moisture.

7. The method according to claim 6 wherein the degree of toasting imparted to the white, fleshed potatoes based upon a dehydrated, untoasted potatoe having a moisture content of 7 percent by weight is equivalent to a reflectance L reading ranging from less than 2 to less than about 20 from that of the untoasted, dehydrated potato.

8. The method according to claim 7 wherein substantially all of the toasted potato product has a particle size of less than 420 microns.

9. The method according to claim 8 wherein the comparative reflectance L reading ranges from less than 4 to less than about 20 from that of the untoasted dehydrated potato.

10. The method according to claim 9 wherein the dry weight ratio of toasted to untoasted potatoes ranges from about 1:19 to about 3:17.

11. The method according to claim 10 wherein the product is dehydrated to a moisture content ranging from about 4 to 8 weight percent.

12. The method according to claim 10 wherein the admixture is dehydrated by a drum drying process step.

13. A method of preparing an edible, whipped mashed potato product comprising:

(a) heating an aqueous medium to a temperature of at least 150° F. to provide a heated aqueous medium;

(b) admixing the heated aqueous medium with dehydrated potato solid particulates, said particulates consisting essentially of untoasted potato particles and toasted potato particles, said toasted potato particles constituting from 5 to 30 percent of the potato particulate weight, said toasted particles being further characterized by the degree of toasting imparted thereto as evidenced by a reduced comparative reflectance L value ranging from less than 10 to about 20 percent of that provided by the untoasted, dehydrated potato particles;

(c) discontinuing the admixing thereof for a period of time sufficient to allow the potato particulates to absorb water; and, (d) whipping the potato particulates containing the absorbed water for a period of time sufficient to provide a mashed potato product.

14. The method according to claim 13 wherein the amount of water employed prior to the whipping thereof ranges from about 4 to about 6 parts by weight for each part by weight of potato solid.

15. The method according to claim 14 wherein the potato particles are toasted potato flakes and untoasted potato flakes and the amount of toasted potato ranges from about 5 to about 15 weight percent.

16. The method according to claim 14 wherein the particles consist essentially of a matrix of untoasted, dehydrated potatoes containing toasted, dehydrated potato particles uniformly distributed throughout said matrix and the amount of toasted potato particles ranges from about 5 to about 15 weight percent of the total dry potato weight.

17. The method according to claim 16 wherein the amount of water is about 5 parts by weight.

18. The method according to claim 15 wherein the percent of potato solids is about 5 parts by weight.

References Cited

UNITED STATES PATENTS 3,282,704   11/1966   Fritzberg _____ 99—207

A. LOUIS MONACELL, Primary Examiner

WILLIAM A. SIMONS, Assistant Examiner

U.S. Cl. X.R.

99—100